United States Patent
Wang et al.

(10) Patent No.: US 12,147,407 B2
(45) Date of Patent: Nov. 19, 2024

(54) METHOD FOR MATHEMATICAL LANGUAGE PROCESSING VIA TREE EMBEDDINGS

(71) Applicants: William Marsh Rice University, Houston, TX (US); University of Massachusetts, Boston, MA (US)

(72) Inventors: Zichao Wang, Houston, TX (US); Shiting Lan, Boston, MA (US); Richard G. Baraniuk, Houston, TX (US)

(73) Assignees: William Marsh Rice University, Houston, TX (US); University of Massachusetts, Boston, MA (US)

( * ) Notice: Subject to any disclaimer, the term of this patent is extended or adjusted under 35 U.S.C. 154(b) by 0 days.

(21) Appl. No.: 18/305,220

(22) Filed: Apr. 21, 2023

(65) Prior Publication Data

US 2023/0342348 A1 Oct. 26, 2023

Related U.S. Application Data

(60) Provisional application No. 63/333,423, filed on Apr. 21, 2022.

(51) Int. Cl.
*G06F 16/22* (2019.01)

(52) U.S. Cl.
CPC .............. *G06F 16/2246* (2019.01)

(58) Field of Classification Search
CPC .................................... G06F 16/2246
See application file for complete search history.

(56) References Cited

U.S. PATENT DOCUMENTS

| | | | |
|---|---|---|---|
| 8,060,360 B2* | 11/2011 | He | G06F 40/45 704/10 |
| 2005/0192807 A1* | 9/2005 | Emam | G06F 40/232 704/260 |
| 2018/0043184 A1* | 2/2018 | Wu | A61N 5/1077 |
| 2020/0279024 A1* | 9/2020 | Misawa | G06N 3/045 |
| 2022/0309815 A1* | 9/2022 | Hamaguchi | G06V 30/12 |

* cited by examiner

*Primary Examiner* — Baoquoc N To
(74) *Attorney, Agent, or Firm* — Osha Bergman Watanabe & Burton LLP (57) ABSTRACT

A method for processing formulae includes encoding a formula by: training, with a server, a model by using a machine learning algorithm with a data set that includes a plurality of formulae; transforming, with a processor, a first formula into a tree format using the trained model; converting, with the processor, the tree format of the first formula into a plurality of lists; and encoding, with the processor, the plurality of lists into a fixed dimension vector by leveraging a stacked attention module; and generating one or more formula candidates by: obtaining, with the processor, input information; and generating, with the processor, one or more second formula candidates based on input information by using the stacked attention module with a tree beam search algorithm.

14 Claims, 9 Drawing Sheets

Algorithm 1: Tree Beam Search

Require: Decoder $p_{dec}$, maximum generation step $T$, beam size $B$
Input : tree embedding $e$
Output : (node, position) tuples $F = \{(U_b, Q_b)\}_{b=1}^{B}$ where
$U_b = \{u_{t,b}\}_{t=1}^{T'}$ and $Q_b = \{q_{t,b}\}_{t=1}^{T'}$ Initialize stacks $S_1, \ldots, S_B$;
Initialize $U_1, \ldots, U_B, Q_1, \ldots, Q_B$;
$u_0 = \texttt{<start>}, q_1 = 0$;

Generate next $B$ nodes $u_{1,1}, \ldots, u_{1,B}$;
Add $u_{1,b}$ to $U_b$ and $q_{1,b}$ to $Q_b$ for $b \in [1, B]$;
for $b = 1, \ldots, B$ do
    if $u_{1,b}$ *is not* $\texttt{<end>}$ then
        Initialize struct $A_{1,b}$;
        $A_{1,b}.u = u_{1,b}, A_{1,b}.a = 0, A_{1,b}.q = q_{1,b}$;
        Push $A_{1,b}$ onto $S_b$;
        Compute $q_{2,b}$ via Eq. 3;
    else
        Add $(U_b, Q_b)$ to $F$;

for $t = 1, \ldots, T$ do
    Generate next nodes $u_{t+1,b}$ and update stacks $S_b$;
    for $b = 1, \ldots, B$ do
        Add $u_{t+1,b}$ to $U_b$ and $q_{t+1,b}$ to $Q_b$;
        if $Q_b$ *not empty* then
            Update stack $S_b$;
            Compute $q_{t+2,b}$ via Eq. 3;
        else
            Add $(U_b, Q_b)$ to $F$;

if $\text{card}(F) \geq B$ or $S_b = \emptyset \, \forall b$ then
        Break;

METHOD FOR MATHEMATICAL LANGUAGE PROCESSING VIA TREE EMBEDDINGS

CROSS-REFERENCE TO RELATED APPLICATION

This U.S. Patent Application claims priority from U.S. Provisional Application No. 63/333,423, filed on Apr. 21, 2022. The content of this provisional application is hereby incorporated by reference herein in its entirety.

STATEMENT REGARDING FEDERALLY SPONSORED RESEARCH

This invention was made with government support under Grant Nos. 1937134, DRL-1631556, IUSE-1842378, U.S. Pat. No. 1,917,713, HTF-1936915 awarded by the National Science Foundation and Grant No. N00014-20-1-2534 awarded by the Department of Defense. The government has certain rights in the invention.

BACKGROUND OF THE INVENTION

Recent years have seen increasing proliferation of scientific formulae as a data format. With its unique set of symbols and language structure, scientific formulae complement natural language in concisely and precisely communicating essential scientific knowledge. These formulae are also an indispensable part of an ever-growing scientific corpus. However, the large quantity of these formulae also poses challenges for effectively organizing and synthesizing scientific formulae in order to derive new knowledge and insights. An important and common real-world use case is formula retrieval, i.e., finding relevant formulae similar to a query formula. This scenario arises when, for example, researchers search for related work in a large collection of scientific papers or when students look for relevant practice problems in a textbook when doing algebra homework.

Indeed, mathematical language processing is a rapidly growing field with a wide range of applications, including but not limited to, scientific research, engineering, and finance. Many computational tasks require the processing of mathematical expressions and formulas, which often have a complex tree structure. Existing techniques for processing mathematical language typically treat symbols as "words" and use sequential models that ignore the inherent tree structure of formulas, resulting in a loss of important structural information. Although some prior work has proposed tree-based models, they are limited to binary trees and cannot handle formulas with an arbitrary number of children.

Therefore, there is a need for a more efficient and accurate model that can process the tree structure of mathematical expressions and formulas while maintaining high speed, low cost, and easy implementation. Such a model can significantly improve the performance of mathematical language processing applications, including but not limited to, automated theorem proving, mathematical formula recognition and retrieval, and natural language generation from mathematical expressions.

BRIEF SUMMARY OF THE INVENTION

In general, in one aspect, the claimed invention relates to a method for processing formulae, which includes encoding a formula and generating one or more second formula candidates. Encoding the formula may be performed by training, with a server, a model by using a machine learning algorithm with a data set that includes a plurality of formulae; transforming, with a processor, a first formula into a tree format using the trained model; converting, with the processor, the tree format of the first formula into a plurality of lists; and encoding, with the processor, the plurality of lists into a fixed dimension vector by leveraging a stacked attention module. Generating the one or more formula candidates may be performed by obtaining, with the processor, input information; and generating, with the processor, one or more second formula candidates based on input information by using the stacked attention module with a tree beam search algorithm.

BRIEF DESCRIPTION OF THE DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Although multiple dependent claims are not introduced, it would be apparent to one of ordinary skill that the subject matter of the dependent claims of one or more embodiments may be combined with other dependent claims.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

It is also to be understood that, while the disclosure may use terms such as "framework" to discuss the invention, such discussion also implies that the corresponding "method" is also included. Because both terms provide a set of rules, guidelines, and tools that provide a foundation for developing software applications, the "method" and "framework" may be used interchangeably throughout the disclosure.

Math education is of crucial importance to a competitive future science, technology, engineering, and mathematics (STEM) workforce since math knowledge and skills are required in many STEM subjects. STEM majors need to use math formulas because math provides a universal language for describing and modeling natural phenomena, physical systems, and abstract concepts. Mathematical formulae, however, are often labor-intensive because they involve complex symbols, formulas, and notations that must be carefully written and arranged in a specific way to convey the intended meaning accurately. Additionally, mathematical expressions often involve a large number of variables and constants that must be defined and referenced throughout the equation, adding to the complexity. Even with the aid of computer software, it can still be a time-consuming task. Furthermore, understanding and interpreting mathematical expressions can be challenging, especially for individuals who are not familiar with the specific symbols and notations used in the equation.

The discussed invention, which is a new approach for scientific formula retrieval using tree embeddings, aims to solve the problem of labor-intensive and time-consuming formula retrieval for humans. This scenario arises when researchers search for related work in a large collection of scientific papers or when students look for relevant practice problems in a textbook when doing algebra homework. The proposed automatic method highly benefits these users by providing an efficient and accurate way to retrieve relevant formulae similar to a query formula.

In general, embodiments of this disclosure includes a new method for processing mathematical formula representations using tree embeddings. By representing each symbolic formula (such as math equation) as an operator tree, one can explicitly capture its inherent structural and semantic properties. According to one or more embodiments, the proposed method includes an encoding step that encodes the formula's operator tree into a vector and a tree decoder that generates a formula from a vector in operator tree format. To improve the quality of formula tree generation, a novel tree beam search algorithm that is of independent scientific interest has been developed. The method is validated on a formula reconstruction task and a similar formula retrieval task on a new real-world dataset of over 770 k formulae collected online. The experimental results show that the method significantly outperforms various baselines.

More specifically, the proposal is a novel general framework to efficiently encode and automatically generate mathematical formulae. This new framework can be used (1) for mathematical content retrieval, including finding formulae similar to a query formula in a large number of scientific and mathematical documents and (2) to automatically generate valid and potentially never-seen-before formulae. The proposed framework include two novel algorithms for encoding and generating math formulae, respectively. The proposed invention enables next generation search engines for mathematical content and machine-assisted scientific/mathematical content writing/generation where formulae are involved. The proposal also has significant potential in personalized education applications, enabling automatic grading, feedback forwarding, cheating detection, question generation in STEM disciplines where math formulae are involved.

The proposed framework leverages the explicit tree structure of math formulae and the power of modern deep learning algorithms. The framework consists of two major components, a novel math formula encoder and a novel math formula generator.

The encoder's goal is to encode a formula into a numeric feature in the form of a fixed dimension vector. First, the encoder takes a formula in either LaTeX or mathML format, both of which are common in today's scientific/mathematical content, into a tree structure in which nodes represent variables, math operators and numbers and edges represent the hierarchical relationship among nodes. Next, the encoder converts the tree format of the input formula into two lists including a list of nodes by depth-first traversal of the tree and a list of positions indicating the relative position of each node in the tree. Finally, the encoder leverages a stacked attention module composed of layers of deep neural networks to encode these two lists into a fixed dimensional vector. The stacked attention module is a type of neural network layer that uses multiple layers of attention mechanisms, each of which computes an attention weight for each input element based on its relationship with other elements, and output of each self-attention layer is then fed into a next layer.

This vector is an effective and succinct numeric summarization of the input formula. It can be used for a variety of downstream tasks. For example, for math formulae retrieval, one can compute the cosine similarity between the vector of a query formula and a collection of candidate formulae to find the formulae that are most similar to the query.

The generator's goal is to generate a formula from a piece of "guide" information. This piece of information serves as a guide that tells the generator to generate the most appropriate formula. For example, it could be a vector representation of the formula to be generated, in which case the generator simply aims to reconstruct the input formula from its encoded vector. It could also be a vector representation of a paragraph or text, in which case the generator is asked to generate a relevant formula based on the provided paragraph. The generator uses the same stacked attention module as the encoder.

In addition, a novel tree beam search is applied as discussed below, which is a more advanced version of greedy algorithm. The tree beam search enables us to generate higher quality formula compared to simple greedy search.

Figure 1A:
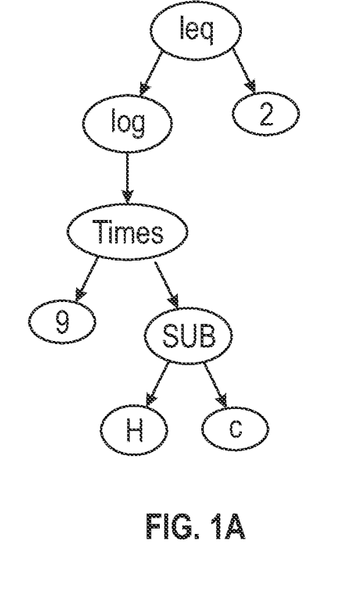
FIG. 1a-FIG. 1c show examples of formulae and their corresponding operator trees in accordance with one or more embodiments.
Figure 1B:
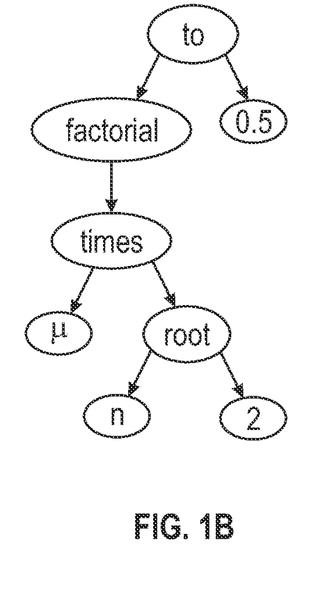
Figure 1C:
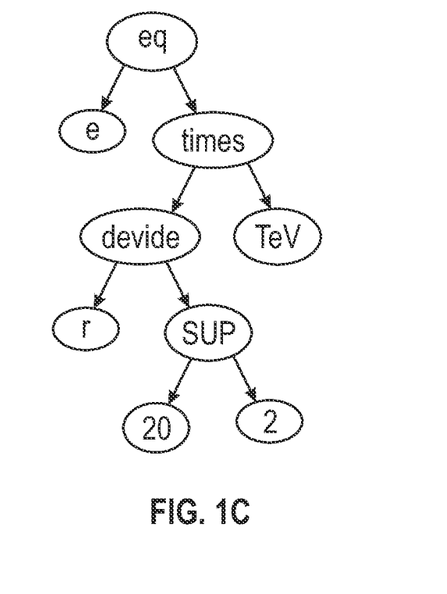

FIG. 1a-FIG. 1c show examples of simple formulae and their corresponding operator trees (OTs).

To explain, the proposed framework leverages the explicit tree structure of math formulae and the power of modern deep learning algorithms. The tree structure of math formulae is a representation of mathematical expressions as a hierarchical structure of nodes and edges. Each node in the tree corresponds to either an operand (such as a variable, constant, or operator) or a grouping symbol (such as parentheses). The edges between nodes represent the relationships between operands and operators and indicate the order in which operations should be performed.

For example, consider the formula "a+b*c". This can be represented as an OT with "+" as the root node, "a" as its left child, and "*" as its right child. The "*" node has "b" as its left child and "c" as its right child. This tree structure preserves both the order of operations (multiplication before addition) and the grouping of operands (b and c are grouped together by multiplication). The OT representation can be used to compare formulas for similarity by comparing their corresponding trees using various distance metrics. This allows for efficient retrieval of relevant formulas based on a query formula. Additionally, this representation allows for easy manipulation of formulas using tree-based algorithms such as subtree replacement or pruning.

The tree structure of math formulae captures important structural information about the expression that is lost when it is represented as a linear sequence of symbols. This structure can be leveraged by machine learning models to better understand and manipulate mathematical expressions, which can be especially useful in applications such as automated theorem proving, equation solving, and mathematical language processing.

FIG. 1a, for example, shows that the "leq" (less than or equal to) operator to be the root node, with "log" and "2" being the left child and right child, respectively.

Note that OT is not the only tree representation of scientific formulae and there exist other formula tree representations such as the symbol layout tree. Indeed, the proposed framework is not limited to the tree representation as shown in FIG. 1a-1c. The illustrations of OT are chosen because of the intuitive interpretation and ability to preserve the semantic and structural information in scientific formulae.

Figure 2:
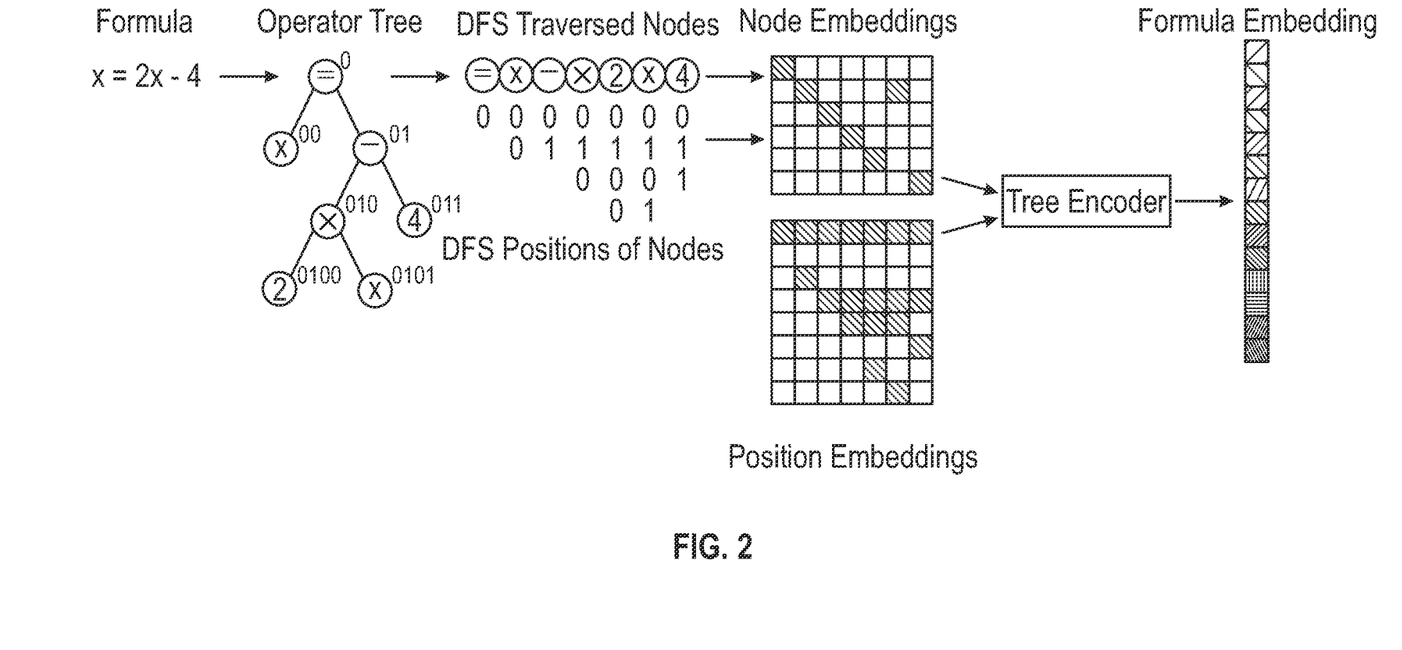
FIG. 2 shows an encoding process in accordance with one or more embodiments.

FIG. 2 is an illustration of the encoding process of a formula.

In one or more embodiments, the encoding process of a formula includes representing a formula as a tree structure.

Generally, in one or more embodiments, the encoding process of a formula involves converting the formula into a structured representation that can be used as input to a machine learning model. One common way to do this is by using a tree-based representation, where each node in the tree represents an operation or operand in the formula.

The encoding process typically involves several steps. First, the formula is parsed to identify the individual symbols and their relationships to each other. Next, the symbols are organized into a tree structure based on their relationships, such as the order of operations or grouping of terms. Finally, the tree structure is converted into a numerical representation, such as a vector or matrix, that can be used as input to a machine learning model.

More specifically, the encoding process starts by tokenizing the formula into a sequence of symbols, including operators, operands, and parentheses. The encoder takes a formula in either LaTeX or mathML format, both of which are common in today's scientific/mathematical content into a tree structure (i.e., OT) in which nodes represent variables, math operators and numbers and edges represent the hierarchical relationship among nodes. The sequence is parsed using a stack-based algorithm to generate the corresponding OT. The algorithm works by pushing each symbol onto a stack until it encounters an operator. When an operator is encountered, it pops its arguments from the stack and creates a new node in the tree with the operator as its label and its arguments as its children. In other words, the encoder converts the tree format of the input formula into a plurality of lists including a list of nodes by depth-first traversal of the tree and a list of positions indicating the relative position of each node in the tree.

Once the OT representation is generated, it is fed into an encoder network to produce a fixed-length vector representation of the formula. The encoder leverages a stacked attention module composed of layers of deep neural networks to encode these two lists into the fixed dimensional vector. This vector representation captures both semantic and structural information about the formula and can be used for various downstream tasks such as retrieval or classification.

Indeed, this vector is an effective and succinct numeric summarization of the input formula. It can be used for a variety of downstream tasks. For example, for math formulae retrieval, one can compute the cosine similarity between the vector of a query formula and a collection of candidate formulae to find the formulae that are most similar to the query.

Turning to FIG. 2, in one or more embodiments, the encoding process includes formula tree traversal and node embedding. In this process, each formula tree in depth first search (DFS) order is traversed to extract node symbols. This step returns a DFS-ordered list of nodes.

Continuing with FIG. 2, a two-step method is used to extract the structure of a formula tree. In the first step, a position of each node may be calculated based on the position of a parent node. In the second step, positions obtained from the previous step may be embedded into fixed dimensional tree positional embeddings.

In addition, an embedding function may be used to transform the formula tree into its embedding. The function includes concatenating the node and tree positional embeddings such that the encoder is aware of both the nodes and their positions.

Indeed, the encoding process is critical for machine learning tasks involving mathematical formulas, as it provides a structured representation of the formula that can capture its underlying semantics and relationships between symbols. The use of a tree-based representation allows the model to leverage the hierarchical structure of formulas, which can help improve its accuracy and ability to generalize to new formulas.

Figure 3A:
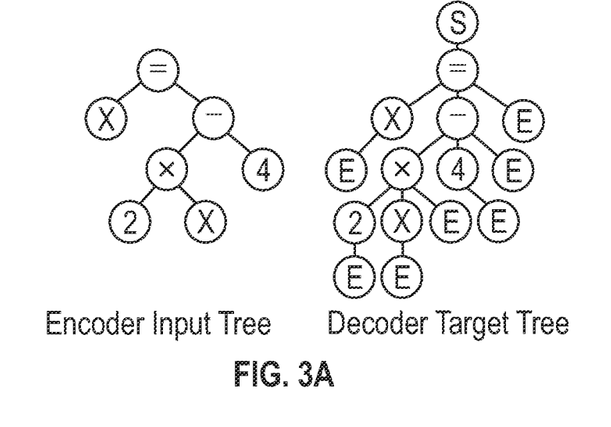
FIG. 3a illustrates input and output operator trees in accordance with one or more embodiments.

FIG. 3a illustrates input and output operator trees in accordance with one or more embodiments.

In one or more embodiments, input and output operator trees refer to the tree structures that represent the input and output mathematical formulas. The input operator tree represents the mathematical formula being input into the model for processing. It includes of nodes that represent the operators and operands in the formula, arranged in a hierarchical structure according to their relationships in the formula. The root node represents the main operator in the formula, and its children nodes represent its operands. These child nodes may themselves have children nodes, representing the operators and operands in sub-expressions of the formula. Each root is connected to one or more child nodes representing sub-expressions within the first formula. Each edge between nodes represents a relationship between the operator and operand. In some embodiments, a leaf node is a node in the generated formula tree that has no child nodes. Specifically, a leaf node represents a basic building block of the formula, such as a variable or constant.

In one or more embodiments, the output operator tree represents the mathematical formula generated by the model as its output. It also consists of nodes that represent the operators and operands in the formula, arranged in a hierarchical structure. However, unlike the input operator tree, the structure of the output operator tree is generated by the model itself, and not by parsing an existing formula. The root node of the output operator tree represents the main operator in the generated formula, and its children nodes represent its operands. The output operator tree can be further processed to obtain the final LaTeX representation of the generated formula.

During decoding, the decoder network generates symbols one at a time based on previously generated symbols and their positions in the output operator tree. The position of each symbol in the output tree is computed using a stack-based algorithm similar to that used during encoding. Indeed, these input and output operator trees provide an efficient way to represent formulas as ordered trees while preserving both their semantic and structural information.

Turning to FIG. 3a, the "S" node represents the special "<start>" node at the root of the tree as discussed above. The "E" nodes represent the special "<end>" node attached as the last child to every node. In other words, FIG. 3a illustrates the modified decoder target formula tree with these additional special nodes and compares it to the encoder input formula tree. The termination condition of tree generation is when the stack is empty, i.e., when there are no more node symbols to generate children. The stack update process is illustrated in FIG. 3b.

Figure 3B:
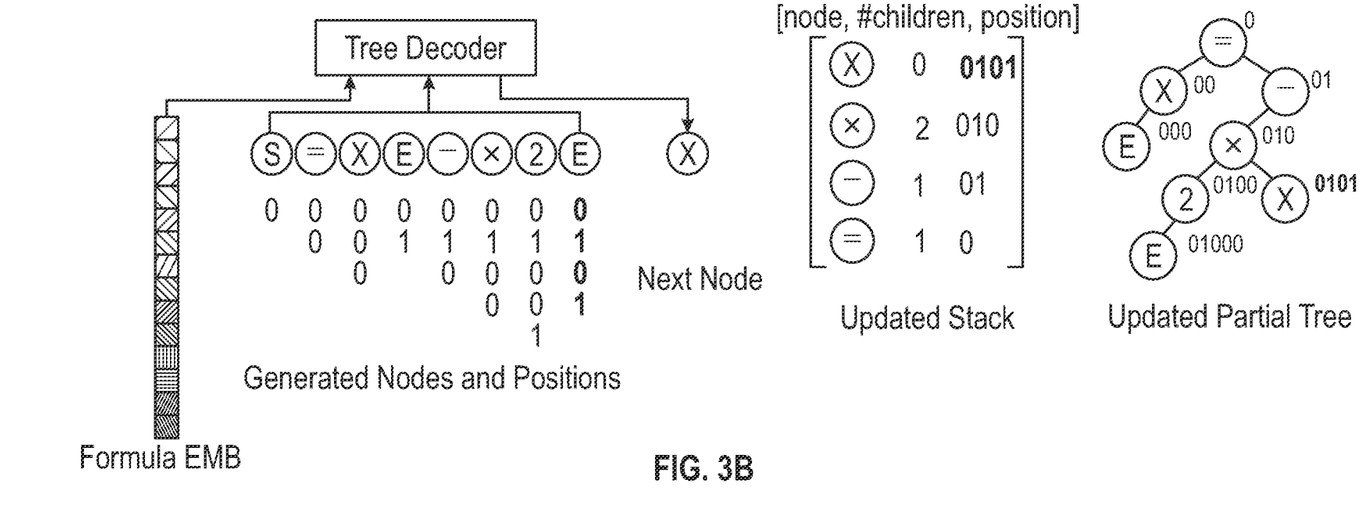
FIG. 3b illustrates a decoding process in accordance with one or more embodiments.

FIG. 3b illustrates a decoding process in accordance with one or more embodiments. First, the position of the next node to be generated is compute. Next, the next node is generated by the decoder using already generated nodes and positions and the newly computed position. Finally, the partial tree and the stack are updated.

To elaborate, the decoding process refers to generating one or more new mathematical formulae based on an encoded input formula (i.e., vector representation). The decoding process uses a modified version of the input operator tree to generate the output formula tree.

In one or more embodiments, the decoding process starts with the generation of a root node for the output formula, which is then expanded recursively to produce a tree structure that represents the output formula. At each level of the tree, the decoder generates a node representing an operator or operand that is consistent with the encoded formula.

The decoder uses the same stacked attention module as the encoder, but in reverse order. At each level, the decoder attends to the relevant parts of the encoded formula, represented by the encoding vectors, and generates a new node based on the attended information. The decoder also uses a separate long short-term memory (LSTM) to capture the context of the generated formula so far. LSTM is a type of recurrent neural network (RNN) architecture designed to handle the vanishing gradient problem that occurs with traditional RNNs.

Once the decoding process is complete, the resulting tree structure is linearized into a LaTeX string representation of the generated formula, which can be used for further analysis or processing. The resulting formula may be different from the input formula, but is expected to be mathematically equivalent.

More specifically, in one or more embodiments, the decoding process starts by initializing the decoder with a special "start" symbol and an empty stack. At each time step, the decoder generates the next symbol in the formula by computing its position in the output operator tree and using previously generated symbols and their positions as input.

To compute the position of the next symbol, the decoder network uses a stack-based algorithm similar to that used during encoding. The algorithm works by maintaining a stack of partially constructed nodes in the output operator tree. Each node on the stack represents an operator that has been generated but whose arguments have not yet been generated. The top node on the stack is always the current node being constructed.

To generate a new symbol, the decoder network first computes its position in the output operator tree based on its parent node and its position relative to its siblings. It then generates the symbol using previously generated symbols and their positions as input. Finally, it updates both the partial tree and stack by adding new nodes for any operators generated by this step.

The decoding process continues until either a maximum length is reached or a special "end" symbol is generated. At this point, the decoder outputs a complete formula tree representing the decoded formula. The number of most probable partial trees is a predetermined parameter that is determined based on requirements of a particular application and available computational resources.

Overall, the decoding process provides an efficient way to generate formulas from vector representations while preserving both their semantic and structural information.

Figure 4:
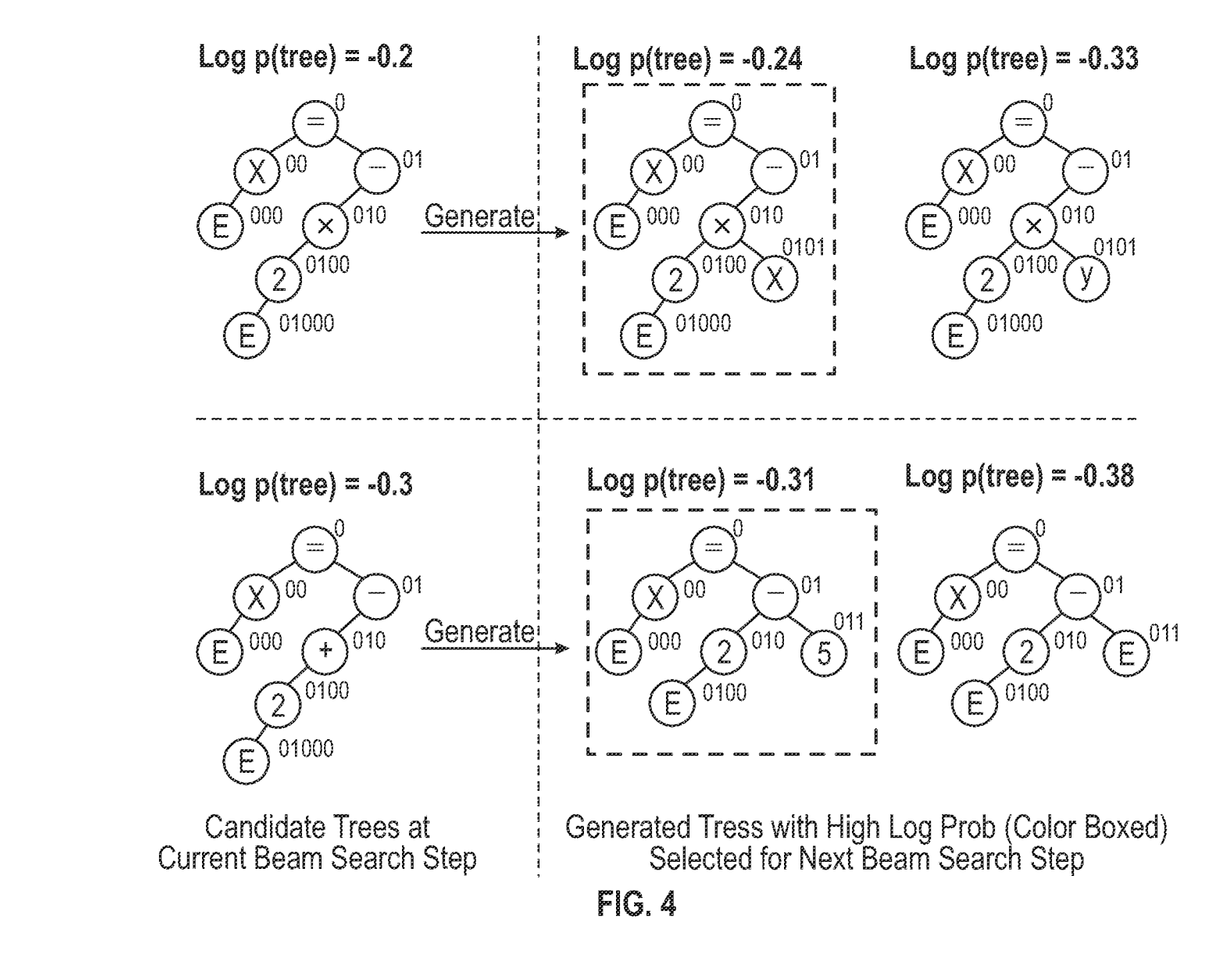
FIG. 4 illustrates tree beam search algorithm (TBS) at a particular time step in accordance with one or more embodiments.

FIG. 4 illustrates tree beam search algorithm (TBS) at a particular time step at a particular time step with a beam size of 2. TBS is an extension of the classic beam search algorithm commonly used for sequence data and is used during the initial generation process for generating higher-quality formula trees.

Specifically, the generating process uses the TBS algorithm to generate higher-quality formula trees than the greedy process used in the initial generation process. The intuition behind TBS is to maintain a set of candidate trees during the generation process, where the size of the set (known as the "beam size") controls the size of the search space. Unlike greedy search, which only keeps one tree that may become suboptimal after more nodes are generated, TBS can keep trees with potentially different structures at each time step in the beam. This allows TBS to explore a larger portion of the search space and potentially find better solutions.

The TBS algorithm works by maintaining a priority queue of candidate trees sorted by their scores (i.e., how well they match the desired output). At each time step, TBS generates new candidate trees by expanding each tree in the current beam with all possible next symbols and adding them to the priority queue. The beam is then updated by selecting the top-k trees from the priority queue based on their scores, where k is equal to the beam size.

This process continues until either a maximum length is reached or a special "end" symbol is generated. At this point, TBS outputs a set of candidate formula trees with potentially different structures at each time step in order to explore a larger portion of the search space and potentially find better solutions than other generation algorithms such as greedy search.

The TBS algorithm provides advantages over traditional models. For example, some traditional models can only perform the encoding task but not the decoding (tree generation task). Some traditional models are limited to processing only binary trees and thus significantly constrain their use cases. For example, a significant portion of math formulae are not binary tree, rendering these models inappropriate for mathematical language processing. On the contrary, the proposed framework in this project is a tree-to-tree model capable of both encoding and generating trees and its general design makes it possible to process trees in which nodes can theoretically have an arbitrary number of children.

Figure 5:
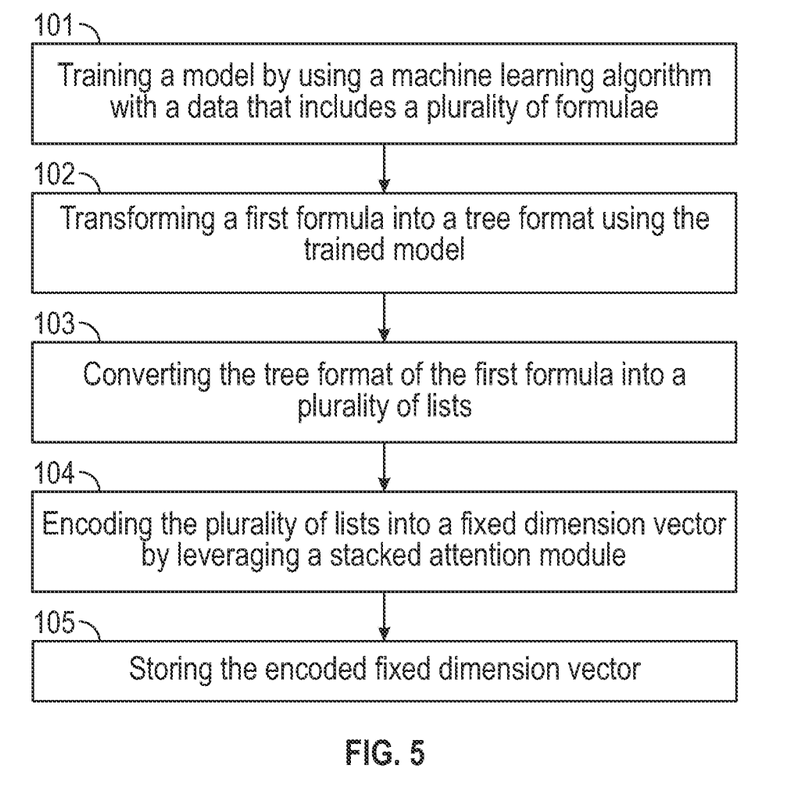
FIG. 5 shows a flowchart in accordance with one or more embodiments.

Turning to FIG. 5, FIG. 5 shows a flowchart in accordance with the implementation of FIG. 2. Specifically, the flowchart illustrates the process for encoding a formula.

Step 101 includes training, with a server, a model by using a machine learning algorithm with a data set that includes a plurality of formulae. A machine learning algorithm is used to train a model on a dataset that includes multiple formulae. The goal of the training process is to learn how to encode formulae into vector representations that capture their semantic meaning. the trained model captures both local and global dependencies between nodes in the tree format for accurate encoding of formulas.

The model may be trained using a supervised learning approach. Specifically, the model may be trained to predict an embedding vector for each node in a given formula tree.

During training, the encoder takes as input a formula tree and generates an embedding vector for each node in the tree. The embedding vectors capture both semantic and syntactic information about each node and its relationships with other nodes in the tree. These embedding vectors are then used as input to downstream tasks such as similar formula retrieval.

The encoder is trained using a loss function that measures the difference between the predicted embeddings and the ground truth embeddings for each node in the formula tree. The loss function encourages the encoder to learn representations that capture important structural features of formulas and are useful for downstream tasks.

To speed up training, mini-batch processing may be used. Unlike some prior works that perform tree traversal during training and can only process a single data point per iteration, the present invention performs traversal before training, which enables mini-batch processing during training. This significantly speeds up training by removing computationally intensive traversal steps from the process.

Step 102 includes transforming, with a processor, a first formula into a tree format using the trained model. Once the model is trained, it can be used to transform an input formula into a tree format using a processor. This involves breaking down the formula into its constituent parts (e.g., operators, variables, constants) and representing them as nodes in an ordered tree structure.

Step 103 includes converting, with the processor, the tree format of the first formula into a plurality of lists. The tree format of the first formula is then converted into multiple lists using the same processor. Each list corresponds to one level of the tree and contains information about the nodes at that level (e.g., their type, position in the tree). The plurality of lists includes a list of nodes and a list of positions.

Step 104 includes encoding, with the processor, the plurality of lists into a fixed dimension vector by leveraging a stacked attention module. The lists are encoded into a fixed-dimensional vector representation using a stacked attention module. This involves applying multiple layers of attention mechanisms to focus on different parts of the input and extract relevant features. The resulting vector represents the input formula in a way that can be used for downstream tasks such as generating output formulas or comparing formulas for similarity.

Step 105 includes storing the encoded fixed dimension vector. The fixed dimension vector may be stored in a memory for future use or fed as input for generating formulae as discussed later.

Figure 6:
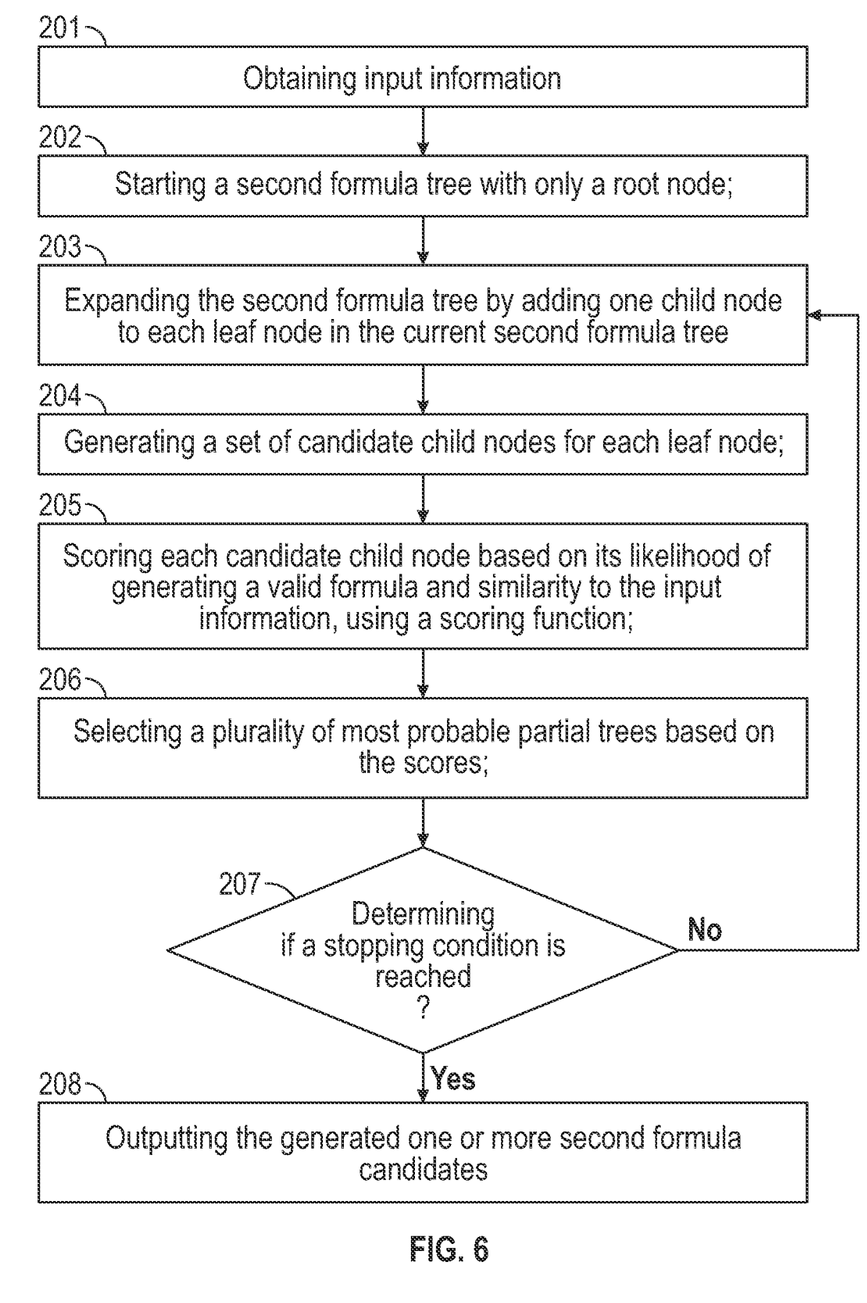
FIG. 6 shows a flowchart in accordance with one or more embodiments.

Turning to FIG. 6, FIG. 6 shows a flowchart in accordance with the implementation of FIG. 4. Specifically, the flowchart illustrates the process for performing the tree beam search algorithm (TBS).

Step 201 includes obtaining input information for generating the second formula candidates. Potential input information could include the type of formula being generated, the specific variables or parameters involved, any constraints or requirements for the formula, and any desired output format or specifications. Other relevant information could include context or background information related to the formula, such as the problem or scenario it is intended to address. The specific input information needed would depend on the intended use case for the formula and the specific requirements of the generator. The input information could be the same fixed dimension vector obtained from step 105.

Step 202 includes starting with a second formula tree that contains only a root node, which corresponds to how the tree beam search algorithm starts with an initial second formula tree.

Step 203 includes expanding the second formula tree by adding one child node to each leaf node in the current second formula tree, which corresponds to how the tree beam search algorithm expands the candidate trees by adding child nodes to each leaf node.

Step 204 includes generating candidate child nodes using the stacked attention module for each leaf node in the expanded second formula tree, which corresponds to how the tree beam search algorithm generates candidate nodes for each leaf node in the candidate trees.

Step 205 includes scoring each candidate child node based on its likelihood of generating a valid formula and similarity to the input information using a scoring function, which corresponds to how the tree beam search algorithm scores each candidate node based on its probability of generating valid formulas and similarity to input formulas. In other words, the scoring function is a function that evaluates a likelihood of generating a valid formula and similarly to the input information.

Step 206 includes selecting a plurality of most probable partial trees based on their scores, which corresponds to how the tree beam search algorithm selects multiple partial trees based on their scores and keeps them in the beam.

Step 207 includes determining repeating steps 203-206 until a stopping condition is reached.

Step 208 includes outputting generated formulas as the final result of the algorithm.

Figure 7:
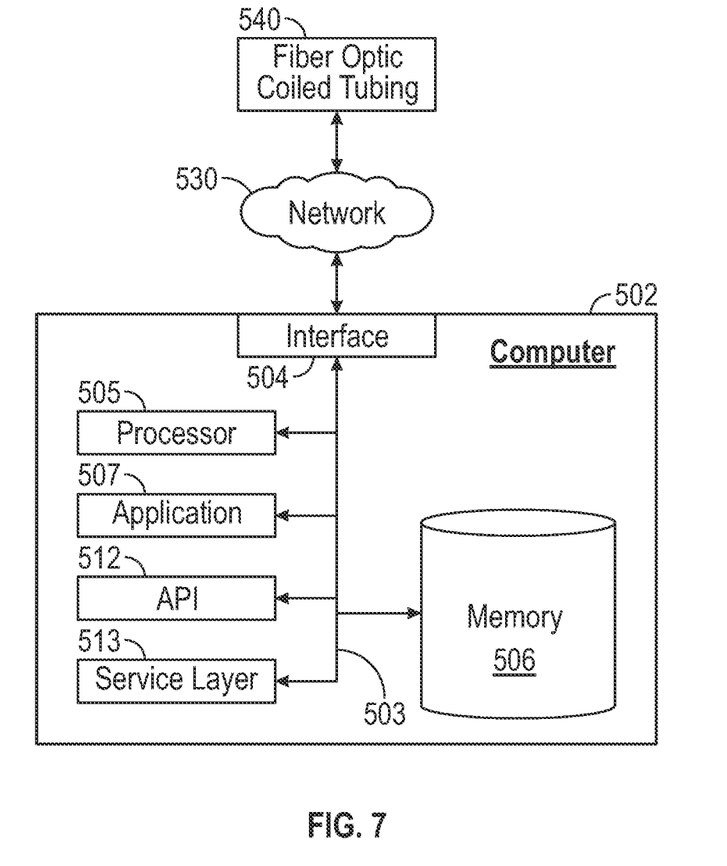
FIG. 7 shows a schematic diagram of a computer system in accordance with one or more embodiments.

Turning to FIG. 7, embodiments may be implemented on a computer system. FIG. 7 is a block diagram of a computer system 502 used to provide computational functionalities associated with described ML (ML) models, methods, functions, processes, flows, and procedures as described in the instant disclosure, according to an implementation. The illustrated computer 502 is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may include a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513. The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 7, two or more interfaces 504 may be used according to particular needs, desires, or particular implementations of the computer 502. The interface 504 is used by the computer 502 for communicating with other systems in a distributed environment that are connected to the network 530. Generally, the interface 504 includes logic encoded in software or hardware (or a combination of software and hardware) and operable to communicate with the network 530. More specifically, the interface 504 may include software supporting one or more communication protocols associated with communications such that the network 530 or interface's hardware is operable to communicate physical signals within and outside of the illustrated computer 502.

The computer 502 includes at least one computer processor 505. Although illustrated as a single computer processor 505 in FIG. 7, two or more processors may be used according to particular needs, desires, or particular implementations of the computer 502. Generally, the computer processor 505 executes instructions and manipulates data to perform the operations of the computer 502 and any ML models, methods, functions, processes, flows, and procedures as described in the instant disclosure.

The computer 502 also includes a memory 505 that holds data for the computer 502 or other components (or a combination of both) that can be connected to the network 530. For example, memory 505 can be a database storing data consistent with this disclosure. Although illustrated as a single memory 505 in FIG. 7, two or more memories may be used according to particular needs, desires, or particular implementations of the computer 502 and the described functionality. While memory 505 is illustrated as an integral component of the computer 502, in alternative implementations, memory 505 can be external to the computer 502.

The application 507 is an algorithmic software engine providing functionality according to particular needs, desires, or particular implementations of the computer 502, particularly with respect to functionality described in this disclosure. For example, application 507 can serve as one or more components, modules, applications, etc. Further, although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with, or external to, a computer system containing computer 502, each computer 502 communicating over network 530. Further, the term "client," "cuser," and other appropriate terminology may be used interchangeably as appropriate without departing from the scope of this disclosure. Moreover, this disclosure contemplates that many users may use one computer 502, or that one user may use multiple computers 502.

In some embodiments, the computer 502 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

As discussed above, one or more embodiments of this disclosure relate to integrating online monitoring with online diagnosis without human intervention, using Artificial Intelligence (AI) and machine learning (ML). One or more embodiments utilize detectors such as ultrasound detectors, instrument current transformers, and thermal cameras, as an input to an Artificial Neural Network (ANN). The one or more embodiments further utilize different classification of outcomes as an output of the ANN to train the machine learned (ML) model in order to identify any equipment issue without the need for equipment shutdown or human intervention. Utilizing the above proposal will save manhours of maintenance crew that can be very expensive and prevent any potential human errors. In addition, one or more embodiments include training a processor to highlight any issue in advance before the issue occurs by identifying the symptoms and expecting the failure.

According to one or more embodiments, the working principle as disclosed herein is based on AI, where multi-input and multi-output data are used to train the specific machine learned model multiple times in order for this ML model to intelligently analyze new inputs and produce an accurate output. The system may include of input detectors, which are ultrasound detector, thermal camera and current transformer. The ultrasound and thermal images are processed through a computer vision algorithm so that useful data can be obtained. Current transformer provides current flow data that can be directly injected in the ML model for training. The detectors may include additional types of sensors. With the multiple input sources, the accuracy level of the present application is improved. Furthermore, the system may utilize a Neural Network (NN) algorithm that is trained with a set of outputs that is assigned with specific input. In other words, the ML model is trained with Supervised Learning.

Figure 8:
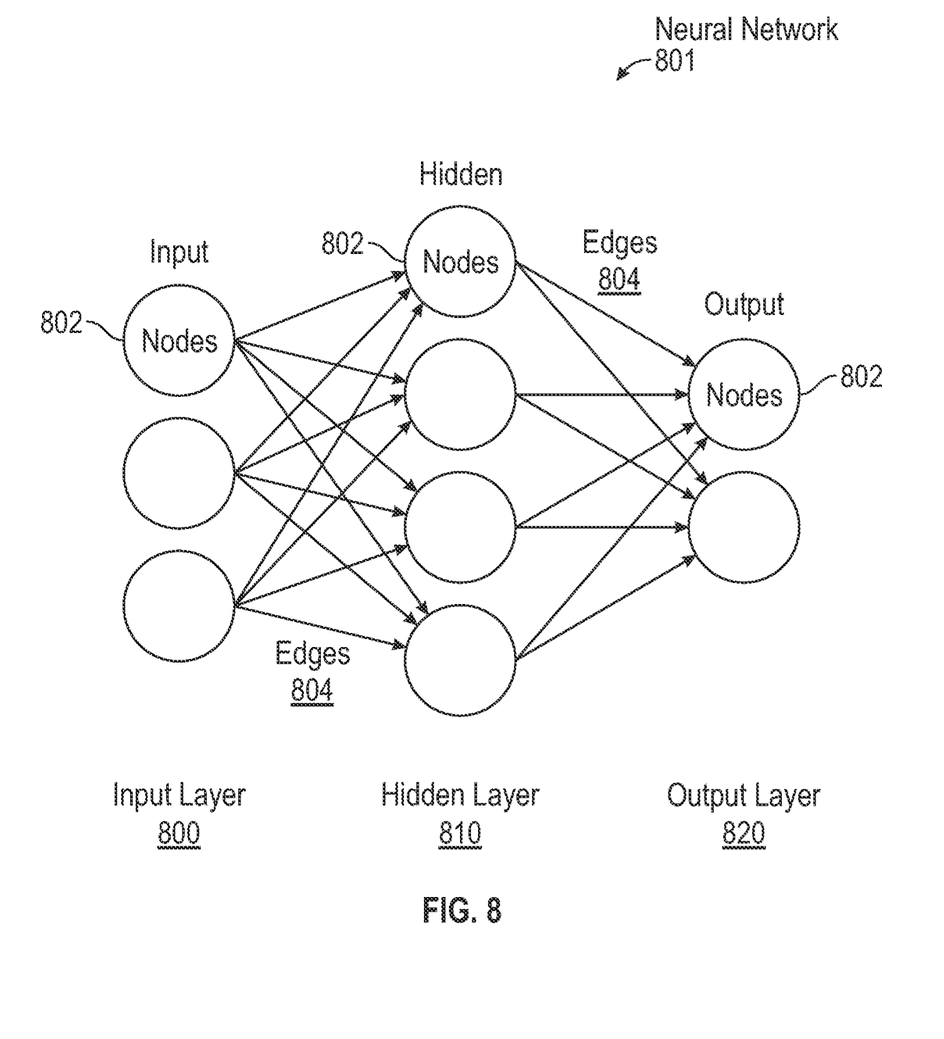
FIG. 8 shows a schematic diagram of a neural network in accordance with one or more embodiments.

Turning to FIG. 8, FIG. 8 shows a neural network of an electrical fault online diagnosis and prediction system. The neural network 801 includes an input layer 800, a hidden layer 810, and an output layer 820. The system may be used to predict different electrical failures that might cause operation shutdown before these electrical failures happen. With the prediction, the electrical equipment can be rectified immediately or a shutdown may be planned to resolve the issues. This system may be installed in high voltage equipment, fixed type medium voltage equipment, or portable type low voltage equipment.

At a high level, a neural network may be graphically depicted as being composed of nodes 802, where here any circle represents a node, and edges 804, shown here as directed lines. The nodes 802 may be grouped to form layers 800, 810 and 820. FIG. 8 displays three layers of nodes 802 where the nodes 802 are grouped into columns, however, the grouping need not be as shown in FIG. 8. The edges 804 connect the nodes 802. Edges 804 may connect, or not connect, to any node 802 regardless of which layer 800, 810, 820 the nodes 802 are in. That is, the nodes 802 may be sparsely and residually connected. A neural network has at least two layers 800, 810, 820, where the first layer 800 is considered the "input layer" and the last layer 820 is the "output layer". Any intermediate layer 810 is usually described as a "hidden layer". A neural network may have zero or more hidden layers 810 and a neural network with at least one hidden layer 810 may be described as a "deep" neural network or as a "deep learning method". In general, a neural network may have more than one node 802 in the output layer 820. In this case the neural network may be referred to as a "multi-target" or "multi-output" network.

Nodes 802 and edges 804 carry additional associations. Namely, every edge is associated with a numerical value. The edge numerical values, or even the edges 804 themselves, are often referred to as "weights" or "parameters". While training a neural network, numerical values are assigned to each edge 804. Additionally, every node 802 is associated with a numerical variable and an activation function. Activation functions are not limited to any functional class, but traditionally follow the form $$A = f\left(\sum\nolimits_{i \in (incoming)} [(\text{node value})_i \, (\text{edge value})_i]\right), \quad \text{EQ 1}$$

where i is an index that spans the set of "incoming" nodes 802 and edges 804 and f is a user-defined function. Incoming nodes 802 are those that, when viewed as a graph, have directed arrows that point to the node 802 where the numerical value is being computed. Some functions for $f$ may include the linear function $f(x)=x$, sigmoid function $$f(x) = \frac{1}{1 + e^{-x}},$$

and rectified linear unit function $f(x)=\max(0, x)$, however, many additional functions are commonly employed. Every node 802 in a neural network may have a different associated activation function. Often, as a shorthand, activation functions are described by the function $f$ by which it is composed. That is, an activation function composed of a linear function $f$ may simply be referred to as a linear activation function without undue ambiguity.

When the neural network receives an input, the input is propagated through the network according to the activation functions and incoming node 802 values and edge 804 values to compute a value for each node 802. That is, the numerical value for each node 802 may change for each received input. Occasionally, nodes 802 are assigned fixed numerical values, such as the value of 1, that are not affected by the input or altered according to edge 804 values and activation functions. Fixed nodes 802 are often referred to as "biases" or "bias nodes" (not shown).

Though not shown in FIG. 8, in some implementations, the neural network may contain specialized layers, such as a normalization layer, or additional connection procedures, like concatenation. One skilled in the art will appreciate that these alterations do not exceed the scope of this disclosure.

As noted, the training procedure for the neural network includes assigning values to the edges 804. To begin training the edges 804 are assigned initial values. These values may be assigned randomly, assigned according to a prescribed distribution, assigned manually, or by some other assignment mechanism. Once edge 804 values have been initialized, the neural network may act as a function, such that it may receive inputs and produce an output. As such, at least one input is propagated through the neural network to produce an output. Training data is provided to the neural network. Generally, training data consists of pairs of inputs and associated targets. The targets represent the "ground truth", or the otherwise desired output, upon processing the inputs. In the context of the instant disclosure, an input is a seismic dataset and its associated target is a bandwidth extended seismic dataset. During training, the neural network processes at least one input from the training data and produces at least one output. Each neural network output is compared to its associated input data target. The comparison of the neural network output to the target is typically performed by a so-called "loss function"; although other names for this comparison function such as "error function", "misfit function", and "cost function" are commonly employed. Many types of loss functions are available, such as the mean-squared-error function, however, the general characteristic of a loss function is that the loss function provides a numerical evaluation of the similarity between the neural network output and the associated target. The loss function may also be constructed to impose additional constraints on the values assumed by the edges 804, for example, by adding a penalty term, which may be physics-based, or a regularization term. Generally, the goal of a training procedure is to alter the edge 804 values to promote similarity between the neural network output and associated target over the training data. Thus, the loss function is used to guide changes made to the edge 804 values, typically through a process called "backpropagation".

While a full review of the backpropagation process exceeds the scope of this disclosure, a brief summary is provided. Backpropagation consists of computing the gradient of the loss function over the edge 804 values. The gradient indicates the direction of change in the edge 804 values that results in the greatest change to the loss function. Because the gradient is local to the current edge 804 values, the edge 804 values are typically updated by a "step" in the direction indicated by the gradient. The step size is often referred to as the "learning rate" and need not remain fixed during the training process. Additionally, the step size and direction may be informed by previously seen edge 804 values or previously computed gradients. Such methods for determining the step direction are usually referred to as "momentum" based methods.

Once the edge 804 values have been updated, or altered from their initial values, through a backpropagation step, the neural network will likely produce different outputs. Thus, the procedure of propagating at least one input through the neural network, comparing the neural network output with the associated target with a loss function, computing the gradient of the loss function with respect to the edge 804 values, and updating the edge 804 values with a step guided by the gradient, is repeated until a termination criterion is reached. Common termination criteria are: reaching a fixed number of edge 804 updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge 804 values are no longer intended to be altered, the neural network 801 is said to be "trained."

In one or more embodiments, the nodes 802 represent variables, math operators and numbers. The edges 804 represent the hierarchical relationship among nodes.

The input layer 800 represents the initial representation of the input formula tree or the embedding vector of the previously generated token, respectively. In the tree encoder, the input layer takes a formula tree as input and applies a series of transformations to generate an embedding vector that captures both semantic and syntactic information about the input formula. The input layer is responsible for processing the raw input data and transforming it into a format that can be used by subsequent layers in the model.

The output layer 820 represents the final prediction of the generated formula tree. Specifically, the output layer takes the final hidden state of the decoder and applies a softmax function to generate a probability distribution over all possible tokens in the vocabulary. The token with the highest probability is then selected as the next token in the generated formula. In addition to generating a valid formula tree, the output layer can also be used for downstream tasks such as similar formula retrieval or formula generation.

The hidden layers 810 represent intermediate representations of the input formula tree and the generated formula tree, respectively.

The tree encoder takes a formula tree as input and processes it through a series of hidden layers to generate an embedding vector that captures both semantic and syntactic information about the input formula. Each hidden layer applies a non-linear transformation to the input features, which allows the model to learn complex patterns and relationships between different parts of the formula tree.

Similarly, the tree decoder takes an embedding vector as input and processes it through a series of hidden layers to generate a sequence of tokens that form a valid formula. Each hidden layer in the decoder generates an intermediate representation of the generated formula tree, which is then used to predict the next token in the sequence.

By using multiple hidden layers 810 in both the encoder and decoder, the framework can learn increasingly complex representations of both input formulas and generated formulas. This allows it to capture more nuanced relationships between different parts of the formula trees and generate high-quality formulas that are both syntactically correct and semantically relevant to the input information.

Figure 9:
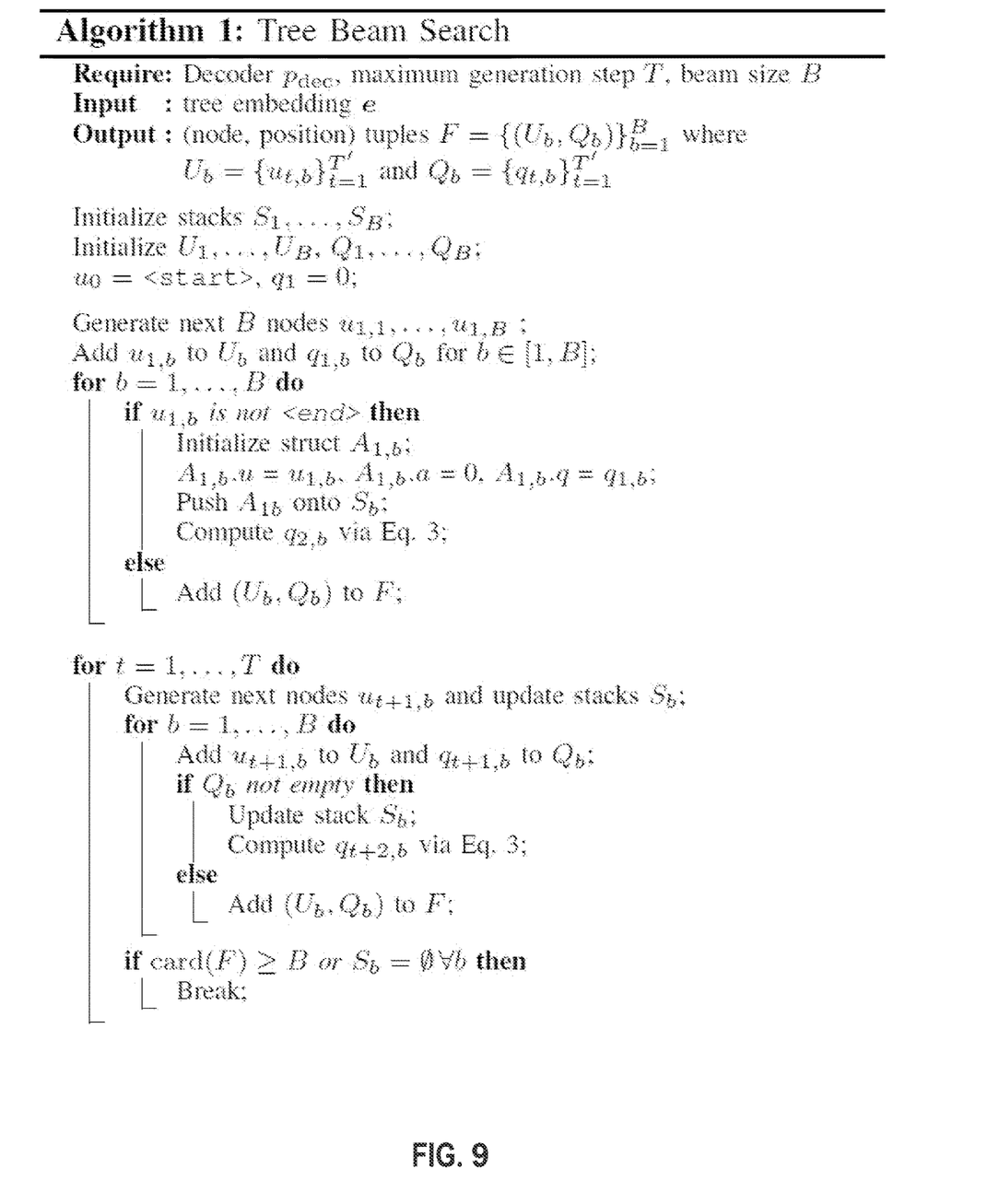
FIG. 9 shows an algorithm in accordance with one or more embodiments.

FIG. 9 illustrates the TBS algorithm. FIG. 9 combined with FIG. 4 explain the TBS algorithm in its entirety. For example, it is specified that the TBS algorithm requires a decoder, a maximum generation step, and a beam size. The TBS algorithm takes a tree embedding as an input, and returns nodes and positions as output.

APPLICATIONS

Embodiments of the discussed invention may be used, as non-limiting examples, in the following scenarios.

Math Content Retrieval

Embodiments of the discussed invention may be used for math content retrieval. Specifically, the discussed framework can be used to develop the next generation math content search engine. Applications include (1) finding similar questions on academic question and answer site involving math at any level (e.g., Math Stack Exchange); (2) finding similar formula and content in a collection of scientific/mathematical articles; (3) finding similar questions or contents in STEM textbooks; (4) clustering students' math answers to scientific/mathematical questions in STEM education to assist teachers for more efficient grading and feedback forwarding. All of these applications aid the search for relevant mathematical information for academic researchers as well as students and teachers in STEM educational settings. The current technologies do not take advantage of the combination of the explicit, inherent tree structure of mathematical formulae and the expressive power of modern deep learning algorithms. Thus, the performance of the discussed framework surpasses existing technologies on formula retrieval tasks. Finally, the framework has potential to serve as a drop-in replacement in some existing math retrieval systems to significantly improve their performance.

Math Content Generation

Embodiments of the discussed invention may be used to automatically generate formula based on a "guide" input. For example, one can use the framework to generate relevant formulae based on a textual description such as a paragraph in a STEM textbook and scientific articles. The ability to automatically generate formula can serve as an intelligent assistant for authoring mathematical content (e.g., providing suggestions on what formula to write next, potentially improving the efficiency in the generation of such content).

In addition to the use cases above, the discussed framework can also be used for (1) automatic grading students' mathematical responses to STEM questions involving formulae; (2) automated derivation and verification of simple mathematical steps or proofs; (3) automatic detection of cheating on answers to math questions involving formulae; (4) automatic generation of formulae from text and vice versa; (5) automatic generation of math practice problems in STEM disciplines with different contexts and numeric values to adapt to interest of different students and teachers; (6) improving math knowledge tracing with models such as item response theory (IRT) by explicitly taking into account of the mathematical content in the question and students' answers.

Indeed, the formula encoding and generation framework described above offers limitless possibilities. The framework is a general tool that can be employed creatively by practitioners in their specific applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for processing formulae comprising:
encoding a formula by:
training, with a server, a model by using a machine learning algorithm with a data set, wherein the data set includes a plurality of formulae;
transforming, with a processor, a first formula into a tree format using the trained model;
converting, with the processor, the tree format of the first formula into a plurality of lists; and
encoding, with the processor, the plurality of lists into a fixed dimension vector by leveraging a stacked attention module;
generating one or more formula candidates by:
obtaining, with the processor, input information; and
generating, with the processor, one or more second formula candidates based on input information by using the stacked attention module in reverse order with a tree beam search algorithm.

2. The method of claim 1, wherein the input information comprises a vector, and wherein the vector represents a paragraph or text.

3. The method of claim 1, wherein the input information comprises the fixed dimension that represents of a formula as encoded by the processor.

4. The method of claim 1, wherein the plurality of lists comprises a list of nodes and a list of positions.

5. The method of claim 1, wherein the tree format includes nodes, edges, and roots.

6. The method of claim 5, wherein each node represents an operator or operand in the first formula.

7. The method of claim 6, wherein each edge between nodes represents a relationship between the operator and operand.

8. The method of claim 6, wherein each root is connected to one or more child nodes representing sub-expressions within the first formula.

9. The method of claim 1, wherein the processor transforms the first formula from a form of LaTeX or mathML format into the tree format.

10. The method of claim 1, wherein the stacked attention module is a type of neural network layer that uses multiple layers of attention mechanisms, each of which computes an attention weight for each input element based on its relationship with other elements, and output of each layer is then fed into a next layer.

11. The method of claim 1, wherein the trained model captures both local and global dependencies between nodes in the tree format for accurate encoding of formulas.

12. The method of claim 1, wherein the tree beam search algorithm comprises:
- starting a second formula tree with a root node;
- expanding the second formula tree by adding one child node to each leaf node in the second formula tree;
- generating a set of candidate child nodes for each leaf node using the stacked attention module;
- scoring each candidate child node based on its likelihood of generating a valid formula and similarity to the input information, using a scoring function;
- selecting a plurality of most probable partial trees based on the scores;
- repeating steps of expanding, generating, scoring, and selecting until a stopping condition is reached;
- outputting the generated one or more second formula candidates.

13. The method of claim 12, wherein the scoring function is a function that evaluates a likelihood of generating a valid formula and similarly to the input information.

14. The method of claim 12, wherein a number of the plurality of the most probable partial trees is a predetermined parameter that is determined based on requirements of a particular application and available computational resources.

* * * * *